A. ROSIN.
PORTABLE HEATER.
APPLICATION FILED DEC. 3, 1917.
1,266,162.
Patented May 14, 1918.
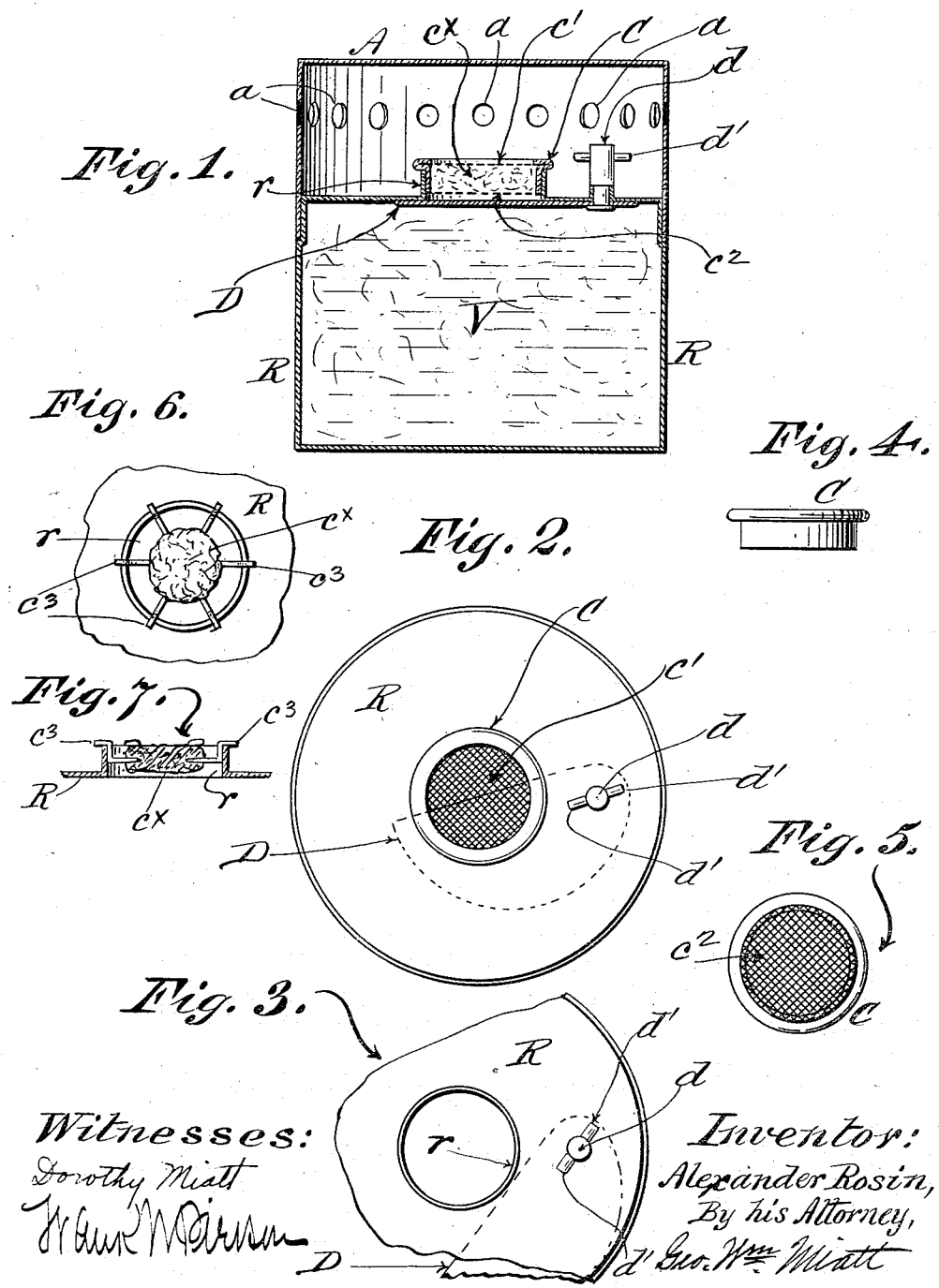

UNITED STATES PATENT OFFICE.

ALEXANDER ROSIN, OF GREAT NECK, NEW YORK.

PORTABLE HEATER.

1,266,162.　　　　　Specification of Letters Patent.　　Patented May 14, 1918.

Application filed December 3, 1917. Serial No. 205,046.

*To all whom it may concern:*

Be it known that I, ALEXANDER ROSIN, a native of Russia, and a resident of Great Neck, in the county of Queens and State of New York, have invented certain new and useful Improvements in Portable Heaters, of which the following is a specification.

My invention is designed to afford a simple, cheap, compact, and effective portable heating device adapted for use as an expedient for temporarily acquiring warmth for person or situation according to exigencies; and it consists essentially of a heating device in which a catalytic agent may be exposed to contact with emanations from a volatile oxidizable substance as well as to the atmosphere, substantially as hereinafter set forth and claimed specifically.

In the accompanying drawings,

Figure 1, is a central vertical sectional elevation of a device adapted to the practical embodiment and use of my invention, with the cover in place, and communication closed between the catalytic cage and the reservoir of volatile material;

Fig. 2, is a top view of the device with the cover removed, and showing communication between the catalytic cage and the volatilization chamber partially closed;

Fig. 3, is a partial top view, with the catalytic cage removed and the port to the volatilization chamber open to the fullest extent;

Fig. 4, is a side elevation of the catalytic cage; and

Fig. 5, a view of the under side thereof.

Fig. 6, is a plan of a portion of the top of the reservoir showing a modification in the means of supporting the catalytic agent;

Fig. 7, is a central vertical sectional elevation of the parts shown in Fig. 6.

In the drawings I have shown my portable heater as cylindrical in general configuration, although this is not an essential feature since the shape or contour of the device may be varied as found desirable or expedient in adapting my invention to the practical requisites of various uses without departing from the spirit and intent of said invention,—the essential feature of which is that of a catalytic agent interposed between the atmosphere and a chamber or reservoir containing a volatile substance the emanations from which are subject to oxidation.

Thus, in the drawings herewith submitted R, represents a reservoir containing volatile material V, either liquid, solid, or in any intermediate condition, as for instance alcohol, liquid or solid, ether, turpentine, or any other desired or available volatile substance oxidizable in the presence of air and in conjunction with a catalytic agent. When the volatile substance is liquid or semi-liquid, or of explosive character, and absorbent material may be provided in the reservoir to stabilize the fluid contents, feed the same to the catalytic cell C, by capillary attraction, and counteract any tendency to ignition within said reservoir R. For this purpose cloth, cotton, infusorial earth and other suitable materials may be provided in the reservoir.

The cage or holder C, for the catalytic material $c^x$, may be of any desired form and construction provided it is furnished with reticulated screens $c'$, $c^2$, or the equivalent thereof which, while confining the said catalytic material $c^x$, within the cell C, admits air thereto on one side and oxidizable vapor on the other. Thus in the drawings the catalytic cell C, is shown as in the form of a flanged cylindrical box, fitting into the neck $r$, of the opening in the top of the reservoir R, and detachable therefrom to give access to the interior of the latter.

While any catalytic agent may be employed for the purpose I prefer platinum on account of its relatively high catalytic force or power,—and it may be used either in the form of platinum wire, platinum sponge, platinum black, platinum asbestos, platinum pumice or any other preparation or platinum, or of several different platinum preparations, as may be found most expedient.

In order to control the feed of oxidizable vapor to the catalytic cell C, I provide a valve or damper D, of any suitable kind,—a simple form being that shown by way of illustration in the drawings, in which said damper D, consists of a pivotally supported plate positioned on the under side of the top of the reservoir R, the pivotal support or trunnion $d$, to which the damper plate D, is rigidly attached, extending above said top and being provided with means whereby it may be turned manually, as by the lateral arms $d'$, $d'$.

Obviously by prescribing the amount of oxidizable vapor admitted to the catalytic cell C, the degree of ignition, combustion, or incandescence therein may be controlled and regulated to suit requirements,—the supply of atmospheric oxygen being constant, and the chemical reactions superinduced on the catalytic surfaces being dependent on the amount of oxidizable vapor supplied thereto. Hence the heat generated may be prescribed within suitable limits, and adapted to the purpose for which the portable heater is to be used.

A cap A, is preferably provided, fitting over the upper part of the reservoir R, and formed with openings $a$, $a$, for the admission of air, and escape of vapor or gaseous products of combustion or chemical reaction. This cover A, is especially desirable when the heater is designed for use upon the person, as a pocket device adapted for use as a foot or hand warmer, or for special application in medical treatment, etc.,—in which latter case it may be shaped to conform to the portion of the body to which it is to be applied. On a larger scale my portable heater may also be adapted for use as a supplementary heater for apartments and inclosures in very cold weather, or where ordinary means of heating fail. In fact the adaptability of the principle involved is obviously very extensive, so that I do not wish to limit myself to the identical form and construction of parts shown.

As an instance in this connection the catalytic agent $c^x$, may be suspended with like result in the neck or port $r$, of the reservoir R, by other means than the reticulated screens $c'$, $c^2$, as, for instance, in the manner indicated in Figs. 6 and 7, by stirrups $c^3$, which are the equivalent of said screens $c'$, $c^2$, since they admit the air and vapor to contact with the catalytic agent $c^x$, consisting in this case, say, of a suitable mass of spongy platinum.

What I claim as my invention and desire to secure by Letters Patent is,

1. A portable heater of the character designated, comprising a reservoir adapted to contain a volatile oxidizable substance, and in conjunction therewith a catalytic cell adapted to contain catalytic material and to receive vapor from said reservoir and also to admit atmospheric oxygen to said catalytic material, together with a damper interposed between said cell and the said substance, and a removable cover inclosing the upper part of said reservoir and said catalytic cell and formed to admit air to the latter, and means within the cover for rotating said damper for the purpose described.

2. A portable heater of the character designated, comprising a reservoir adapted to contain a volatile oxidizable substance, and in conjunction therewith a catalytic cell adapted to contain catalytic material and to receive vapor from said reservoir and also to admit atmospheric oxygen to said catalytic material, together with means disposed beneath said cell and between the same and the upper end of the reservoir for regulating the admission of oxidizable vapor to said catalytic cell, and together with a removable cover inclosing the upper part of said reservoir and said catalytic cell and formed to admit air to the latter and means within the cover for actuating said regulating means, for the purpose described.

ALEXANDER ROSIN.

Witnesses:
   Geo. Wm. Miatt,
   Dorothy Miatt.